United States Patent [19]

Weeds

[11] Patent Number: 4,610,647

[45] Date of Patent: Sep. 9, 1986

[54] CHAIN LINK CONNECTION

[75] Inventor: Arthur Weeds, Auckland, New Zealand

[73] Assignee: McKenzie & Ridley Limited, Auckland, New Zealand

[21] Appl. No.: 780,705

[22] Filed: Sep. 26, 1985

Related U.S. Application Data

[63] Continuation of Ser. No. 686,627, Dec. 31, 1984, abandoned, which is a continuation of Ser. No. 559,419, Dec. 8, 1983, abandoned.

[51] Int. Cl.[4] .......................................... F16G 13/02
[52] U.S. Cl. ................................... 474/206; 474/207; 474/223; 474/233
[58] Field of Search ............... 474/206, 207, 223, 228, 474/229, 233, 219

[56] References Cited

U.S. PATENT DOCUMENTS

| | | | |
|---|---|---|---|
| 1,046,124 | 12/1912 | Wagner | 474/223 |
| 3,099,346 | 7/1963 | Maas | 474/223 X |
| 3,192,785 | 7/1965 | Pearson | 474/228 |
| 3,616,707 | 11/1971 | Ivashkov et al. | 474/207 |

Primary Examiner—James A. Leppink
Assistant Examiner—Frank McKenzie
Attorney, Agent, or Firm—Holman & Stern

[57] ABSTRACT

A connection for use with chain links includes a main body portion which has at least one and preferably two support bars extending outwardly from each side of the main body portion, a recess or groove in the support bar adjacent its distal end spaced from the main body portion a distance to allow a plurality of chain links to be mounted thereon in spaced relationship, a securing clip located within each recess or groove to retain the chain links in position on, and relative to, the support bars with faces being adjacent, and one or more raised portions on at least one face of the chain links to space the chain links apart.

8 Claims, 1 Drawing Figure

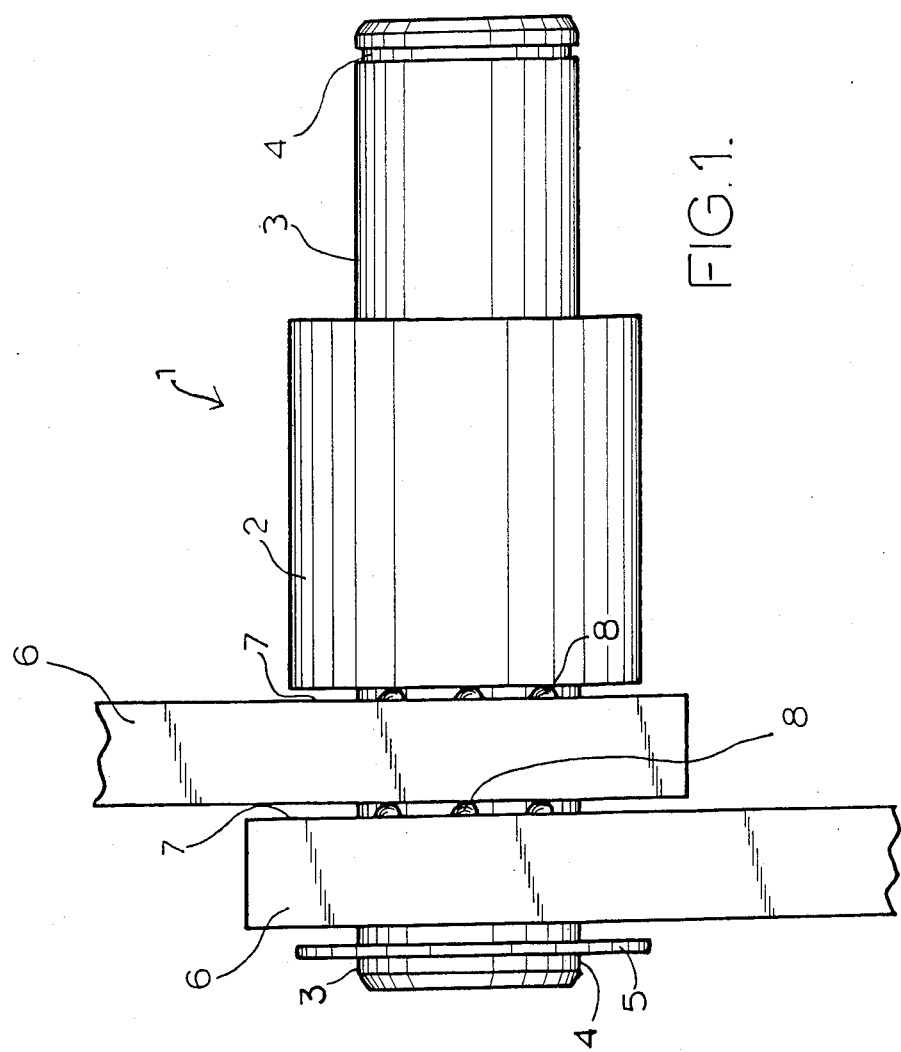

CHAIN LINK CONNECTION

This is a continuation of application Ser. No. 686,627, filed Dec. 31, 1984, now abandoned, which in turn is a continuation of application Ser. No. 559,419, filed Dec. 8, 1983, now abandoned.

BACKGROUND TO THE INVENTION

1. Field of the Invention

This invention relates to a connection and in particular to a connection for chain links or chain members.

2. Description of the Invention

The invention has particular application to the connection of chain links where it is necessary to provide for the cleaning of the chain in position. Thus, in such cases, it is desired to prevent the links from rubbing in abutting relationship directly one against the other to such an extent that it is not possible for cleaning fluid and the like to pass between the links. It is important, especially in areas such as the dairy industry, and the food processing industry, for connectors to be provided that allow links such as in conveyor chains and the like, to be connected one to the other in such a manner that when cleaning takes place the links can be cleaned by the application of cleaning fluid and the like, without having to be disassembled.

SUMMARY OF THE INVENTION

Accordingly, in one aspect of the present invention, there is provided a connection for chain links including a connector having a main body portion and at least one elongate support bar extending outwardly from one side of said main body portion, an annular; a recess or groove in said at least one support bar adjacent its distal end, the distance between the main body portion and the recess or groove in the support bar being such as to allow locating a plurality of chains links engaging over and with the support bar, at least one securing clip located within said recess or groove to maintain the chain links in position on the support bar, and one or more raised portions on adjacent faces of the chain links mounted on the support bar for spacing the adjacent connected links apart.

According to a further aspect of this invention, there is provided a connector including a main body portion, at least one support bar extending outwardly from each side of said main body portion, a recess or groove being provided adjacent the distal end of each support bar, each of the support bars having a plurality of chain links connected thereto, at least one securing clip being located within each recess or groove.

BRIEF DESCRIPTION OF THE DRAWINGS

The invention will now be described by way of example only and with reference to the accompanying drawings, wherein:

FIG. 1: is a chain link connector according to one form of the invention.

DESCRIPTION OF PREFERRED EMBODIMENT

The invention will now be described by way of example only, and it should be appreciated that improvements and modifications may be made to the invention without departing from the scope or spirit thereof, as defined by the appended claims.

The connector 1 according to the present invention is elongate, and preferably substantially circular or cylindrical in formation, having a circular or cylindrical main body portion 2, with at least one, and preferably two, outwardly extending, elongate support bars or arms 3, of a lesser diameter, than the main body portion 2.

The end of each support bar 3 is provided, adjacent its distal end, with at least one circumferential groove or recess 4 which is adapted to house and locate at least one clip ring or circlip 5. In the preferred form of the invention, the distance between the main body portion 2 and each recess or groove 4 for locating and housing a retaining clip 5 is such that a plurality of chain links 6 can be passed over and located thereon, so as to be "loosely located". The term "loosely located", means and is hereinafter generally defined as a location wherein chain links are not positively abutted against one another and are not frictionally engaged against one another or adjacent surfaces, on a face to face basis. "Loosely engaged" therefore is defined as being located between the main body portion 2 and a retaining clip 5, in a manner whereby they are able to move or be positioned relative to one another, so that a spacing is provided therebetween. Thus, when cleaning fluid or cleaning pressure is applied they are able to be moved or held apart, so as to be fully cleaned by the pressure or application of such fluid. There is no permanent surface to surface abutment or frictional engagement between the links. It is however to be appreciated that during operation they may well come into contact with one another or rub against one another; they are not however permanently engaged against one another, face to face.

As indicated hereinbefore, the advantage of this is that by having the links loosely located, then no matter how many links are involved, the loose location provides for them to be moved or held apart when cleaning fluid or pressure (such as steam) is applied for cleaning purposes. This means that all parts of the connector and chain links will be cleaned. As will be appreciated, if the links were connected such as to be positively abutted against each other, such as on a side by side or face to face basis, it would not be certain that positive and total cleaning could take place.

The chain links 6 are provided with suitable holes and recesses which fit over the support bars 3, and circlips or retaining clips 5 are located within the grooves 4 to keep the links in position, between the main body portion 2 and the clips 5.

It is usual for two links 6 to be connected on each side, so that the connector 1 will serve to connect two sets of chain links. This is by way of example only however, and any number of links 6 can be used; it will be appreciated however that this may require an increase or decrease in the size or length of the support bars 3; in particular a variation in the distance between the main body portion 2 and the recess or groove 4 for locating the retaining clip 5.

The connector 1 is preferably constructed of a metal or stainless steel material for hygiene or cleaning purposes, and is easily disassembled by removing the circlips or retaining clips 5. The links 6 can then be removed and the connector removed, repaired and/or cleaned, in a straight forward and efficient manner.

In one form of the invention where the connector 1 is being used to connect a plurality of links 6, additional means are provided for preventing the links 6 from becoming too close together or from remaining in juxtaposition to the disadvantage of cleaning and hygiene.

Thus, referring to the accompanying drawing by way of example, at least one of the adjacent link faces 7 is formed or provided with one or more spacing projecting beads, or raised portions, 8 which can be formed or pressed into the surface(s) of one or both faces or sides of the links 6, so as to extend outwardly thereof. Thus, if the links 6 tend to come into contact with each other on a face to face basis, or with any other surface(s) (such as an adjacent surface of the main body portion 2 or the clip 5), the beads will cause a space or gap to be maintained therebetween thus preventing face to face or total juxtaposition location. This will then maintain at all times a spacing between links and any adjacent surface(s).

The one or more beads or raised portions 8 can be provided at the end portions of the links, these being the portions that will be adjacent to each other when connected by means of the connector of the present invention. It is stressed however that the provision of such beads or raised portions will prevent face to face contact between the chain links and will thus provide for more access during cleaning. The beads or raised portions will also prevent friction that occurs between the chain links at the place of connection.

While the invention is described with reference to dimples 8 it should be appreciated that other raised portions or members can be provided. For example, one or more annular ribs can be provided, which thereby form and act as raised portions, spacing the links 6 one from the other and from adjacent surfaces, as referred to hereinbefore. As an alternative one or more outwardly extending rivets can be provided. These are by way of example only.

This invention has been described by way of example only, and improvements and modifications may be made without departing from the scope or spirit thereof, as defined by the appended claims.

I claim:

1. A connection for chain links comprising:
   a connector having a main body portion and an elongate support bar extending outwardly from at least one side of said main body portion and having a smaller cross-sectional area than that of said main body portion to form a shoulder therebetween;
   an annular groove in said elongate support bar adjacent a distal end thereof remote from said shoulder, the distance between said shoulder and groove being predetermined to allow a plurality of chain links to be mounted on and engaged with said support bar with faces on said chain links in adjacent facing relationship;
   a retaining clip engaged in said groove for retaining said chain links in position on said support bar between said shoulder and said retaining clip; and
   at least one raised portion on at least one of said adjacent faces of said chain links so that said raised portion is between said adjacent faces and engageable with the other of said adjacent faces for maintaining said adjacent faces of said chain links in relative spaced relationship with open space between said adjacent faces.
2. A connection as claimed in claim 1, wherein said main body portion has two sides:
   said elongate support bar extends outwardly from each side of said main body portion to form two said shoulders;
   said annular groove is provided in each of said support bars adjacent distal ends thereof;
   a plurality of chain links are mounted on and engaged with each support bar;
   a said retaining clip is engaged in each groove for retaining said respective chain links in position on said respective support bars; and
   said at least one raised portion is provided on said at least one of said adjacent faces of said chain links on each support bar.
3. A connection as claimed in claim 1 wherein:
   said at least one raised portion on said at least one of said adjacent faces of said chain links is in the form of a bead.
4. A connection as claimed in claim 1 wherein:
   said at least one raised portion on said at least one of said adjacent faces of said chain links is in the form of an annular rib.
5. A connection as claimed in claim 2 wherein:
   said at least one raised portion on said at least one of said adjacent faces of said chain links on each support bar is in the form of a bead.
6. A connection as claimed in claim 2 wherein:
   said at least one raised portion on said at least one of said adjacent faces of said chain links on each support bar is in the form of an annular rib.
7. A connection for chain links comprising:
   a connector having a circular cylindrical outer surface, a main body portion, and an elongate support bar extending outwardly from at least one side of said main body portion and having a smaller diameter than said main body portion and a smaller cross-sectional area than that of said main body portion to form a shoulder therebetween, said shoulder being flat and extending in a plane at right angles to the axis of said support bar;
   an annular groove in said elongate support bar adjacent a distal end thereof remote from said shoulder, the distance between said shoulder and groove being predetermined to allow a plurality of chain links to be mounted on and engaged with said support bar with adjacent chain links having faces in adjacent facing relationship;
   a retaining clip engaged in said groove for retaining said chain links in position on said support bar between said shoulder and said retaining clip;
   a plurality of raised portions each in the form of a bead on at least one of said adjacent faces of said chain links mounted on said support bar for maintaining said chain links in relative spaced relationship;
   a face on said chain link adjacent to and facing said shoulder; and
   a plurality of raised portions in the form of beads on said face of said chain link adjacent to and facing said shoulder and engageable therewith for maintaining said chain link adjacent said shoulder in spaced relation to said shoulder.
8. A connector as claimed in claim 1 wherein:
   a plurality of raised portions are provided integrally in spaced relationship on one of said adjacent faces to provide open spaces between said raised portions and said adjacent faces.

* * * * *